United States Patent
Witt et al.

[11] Patent Number: 6,079,005
[45] Date of Patent: Jun. 20, 2000

[54] MICROPROCESSOR INCLUDING VIRTUAL ADDRESS BRANCH PREDICTION AND CURRENT PAGE REGISTER TO PROVIDE PAGE PORTION OF VIRTUAL AND PHYSICAL FETCH ADDRESS

[75] Inventors: David B. Witt; Thang M. Tran, both of Austin, Tex.

[73] Assignee: Advanced Micro Devices, Inc., Sunnyvale, Calif.

[21] Appl. No.: 08/975,224

[22] Filed: Nov. 20, 1997

[51] Int. Cl.[7] .................................................. G06F 9/38
[52] U.S. Cl. .................... 711/213; 712/239; 712/237; 712/233; 711/204; 711/220
[58] Field of Search ................................ 711/3, 118, 113, 711/125, 213, 239, 204, 220; 712/233, 237, 239

[56] References Cited

U.S. PATENT DOCUMENTS

| | | |
|---|---|---|
| 4,044,338 | 8/1977 | Wolf . |
| 4,400,774 | 8/1983 | Toy . |

(List continued on next page.)

FOREIGN PATENT DOCUMENTS

| | | |
|---|---|---|
| 0259095 | 3/1988 | European Pat. Off. . |
| 0 395 835 A2 | 1/1990 | European Pat. Off. . |
| 0381471 | 8/1990 | European Pat. Off. . |
| 0 431 463 A2 | 6/1991 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Patterson et al., *Computer Architecture A Quantitative Approach*, Morgan Kaufmann Publishers, Inc., 1990, pp. 432–474.

White, et al., "How Computers Work, A Detailed Look at What's Going on Inside Your PC and Peripherals," PC/Computing, Feb. 1993, pp. 282–309.

International Search Report EP 95 30 0714 dated Jun. 7, 1995.

White, et al., "RAM Cache—Speedy Memory on the Motherboard Makes Standard RAM Seem Even Faster" PC/Computing, Mar. 1993, pp. 262–270.

Intel 1994 Pentium Processor Family User's Manual, vol. 1: Pentium Processor Family Data Book, pp. 2–1 through 2–4.

(List continued on next page.)

*Primary Examiner*—B. James Peikari
*Attorney, Agent, or Firm*—Conley, Rose & Tayon, P.C.; Lawrence J. Merkel

[57] ABSTRACT

A microprocessor employs a branch prediction unit including a branch prediction storage which stores the index portion of branch target addresses and an instruction cache which is virtually indexed and physically tagged. The branch target index (if predicted-taken), or the sequential index (if predicted not-taken) is provided as the index to the instruction cache. The selected physical tag is provided to a reverse translation lookaside buffer (TLB) which translates the physical tag to a virtual page number. Concatenating the virtual page number to the virtual index from the instruction cache (and the offset portion, generated from the branch prediction) results in the branch target address being generated. In one embodiment, a current page register stores the most recently translated virtual page number and the corresponding real page number. The branch prediction unit predicts that each fetch address will continue to reside in the current page and uses the virtual page number from the current page to form the branch Target address. The physical tag from the fetched cache line is compared to the corresponding real page number to verify that the fetch address is actually still within the current page. When a mismatch is detected between the corresponding real page number and the physical tag from the fetched cache line, the branch target address is corrected with the linear page number provided by the reverse TLB and the current page register is updated.

16 Claims, 9 Drawing Sheets

U.S. PATENT DOCUMENTS

| | | |
|---|---|---|
| 4,453,212 | 6/1984 | Gaither et al. . |
| 4,551,797 | 11/1985 | Amdahl et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,305,444 | 4/1994 | Becker et al. . |
| 5,392,410 | 2/1995 | Liu ................................................ 711/3 |
| 5,689,672 | 11/1997 | Witt et al. ................................ 712/213 |
| 5,737,590 | 4/1998 | Hara . |
| 5,764,946 | 6/1998 | Tran et al. .............................. 712/239 |
| 5,826,074 | 10/1998 | Blomgren ................................ 712/234 |
| 5,900,025 | 5/1999 | Kranich . |
| 5,938,761 | 8/1999 | Patel et al. . |
| 5,949,995 | 9/1999 | Freeman . |
| 5,954,814 | 9/1999 | Zaidi et al. . |
| 5,954,816 | 9/1999 | Tran et al. . |

OTHER PUBLICATIONS

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

*PowerPC 601 RISC Microprocessor User's Manual*, Motorola, Inc., 1993, pp. 1–7, 1–8, 1–28, 6–1 through 6–16.

U.S. application No. 08/974,972.

MICROPROCESSOR INCLUDING VIRTUAL ADDRESS BRANCH PREDICTION AND CURRENT PAGE REGISTER TO PROVIDE PAGE PORTION OF VIRTUAL AND PHYSICAL FETCH ADDRESS

CROSS REFERENCE TO RELATED APPLICATIONS

This application is related to U.S. patent application Ser. No. 08/974,972, filed Nov. 20, 1997.

BACKGROUND OF THE INVENTION

1. Field of the Invention

This invention is related to the field of microprocessors and, more particularly, to instruction fetch and branch prediction mechanisms within microprocessors.

2. Description of the Related Art

Superscalar microprocessors achieve high performance by executing multiple instructions per clock cycle and by choosing the shortest possible clock cycle consistent with the design. Conversely, superpipelined microprocessors include a large number of pipeline stages for executing an instruction, such that an extremely short clock cycle may be supported. As used herein, the term "clock cycle" or "clock cycle time" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises decoding the instruction, executing the instruction, and storing the execution results in the destination identified by the instruction).

In order to further increase performance, microprocessors typically include one or more caches for storing instructions and data. A cache is a storage device configured onto the same semiconductor substrate as the microprocessor, or coupled nearby. The cache may be accessed more quickly than a main memory system coupled to the microprocessor. Generally speaking, a cache stores data and instructions from the main memory system in cache lines (i.e. a cache line is the unit of allocation/deallocation of storage in a cache). A cache line comprises a plurality of contiguous bytes. A certain number of low order bits of an address sufficient to uniquely identify each byte within the cache line is referred to herein as the "offset" of the byte within the cache line. The remaining bits of the address form a tag which may be used to refer to the entire cache line. As used herein, the term "address" refers to a value indicative of the storage location within main memory corresponding to one or more bytes of information.

Caches may be organized into a "set-associative" structure. In a set-associative structure, the cache lines are accessed as a two-dimensional array having rows and columns. When a cache is searched for bytes residing at an address, a number of bits from the address are used as an "index" into the cache. The index selects a particular row within the two-dimensional array, and therefore the number of address bits required for the index is determined by the number of rows configured into the cache. The act of selecting a row via an index is referred to as "indexing". The addresses associated with bytes stored in the multiple cache lines of a row are examined to determine if any of the addresses stored in the row match the requested address. If a match is found, the access is said to be a "hit", and the cache provides the associated bytes. If a match is not found, the access is said to be a "miss". When a miss is detected, the bytes are transferred from the memory system into the cache. The tag addresses (or tags) associated with bytes stored in the cache are also stored. Since the index portion of the address identifies the row of the cache at which the cache line is stored, access to the cache line implies that the index portion of the access address matches the index portion of the tag address. Therefore, the tag address stored within the cache may exclude the index portion of the address (as well as the offset portion).

Microprocessors typically include an address translation mechanism between addresses produced by instruction execution (e.g. by adding operands of the instructions) and addresses actually presented to a main memory for access. The addresses produced by instruction execution are referred to as "virtual addresses" and addresses which directly refer to main memory locations are referred to as "physical addresses". Often, the mapping between virtual and physical address is managed by software (e.g the operating system). The microprocessor attempts to access a software-managed data structure of translations (e.g. a page table or tables). If a translation for a particular virtual address is not found, then the microprocessor signals software via an exception. The software may allocate a page of memory for the page including the virtual address and create a corresponding translation within the page tables. Upon returning to the program which experienced the exception, a translation may be found by the microprocessor. The unit of allocation for translations is referred to as a "page". A page may be of any size. For example, 4 kilobytes is a typical size. The portion of the address which identifies the page is referred to as the virtual page number (if the address is a virtual address) or the real page number (if the address is a physical address). Therefore, a translation replaces the virtual page number with the corresponding real page number. It is noted that, in cases in which one or more index bits to a cache are translated, then the index may be referred to as virtual or physical depending upon which type of address from which the index is derived.

When address translation is employed by a microprocessor, caches may be virtually tagged (e.g. store tags derived from the virtual addresses) or physically tagged (e.g. store tags derived from the physical addresses). In an instruction cache, for example, it may be advantageous to use virtual tagging for high speed access. The Fetch addresses generated by the microprocessor (e.g. by executing branch instructions) are virtual addresses. By using a virtually addressed cache, the fetch addresses directly index and tag-match with the tags in the cache (i.e. no address translation is needed).

Unfortunately, virtually tagged caches may experience performance degradation at times when translations are changed. For example, translations are changed during a context switch. A context switch occurs when the microprocessor switches between programs being executed, or between a program and the operating system. Since each program may use the same virtual addresses but have different mappings to physical addresses, the virtually tagged cache is usually invalidated on context switches.

More particularly, microprocessors often employ a translation lookaside buffer (TLB) for caching recently accessed translations. If the TLB is flushed (e.g. a context switch, as well as other reasons such as the addition or deletion of a translation from the page tables), then the virtually tagged cache is invalidated. Each cache line is revalidated prior to use by translating the virtual address, causing performance degradation even though cache hits are occurring.

Microprocessors also typically employ branch prediction to speculatively fetch (and potentially execute) instructions beyond a conditional branch instruction. One method of branch prediction is a cache-line based scheme in which one or more branch predictions are stored for each cache line. As a particular cache line is fetched, the corresponding branch prediction(s) is(are) accessed and used to predict the next fetch address. In order to reduce the size of the branch prediction storage, it is desirable to store only the index to be fetched if the corresponding branch instruction is predicted taken (instead of the entire branch target address). If the cache is virtually tagged, then the tag from the cache line selected by providing the branch prediction index to the instruction cache can be concatenated with the branch prediction index to form the predicted branch target address. The predicted branch target address can then be compared to the branch target address generated by executing the branch instruction to determine if the branch target address is (correctly predicted. A physically tagged cache would not generate the correct branch target address (which is a virtual address). A method for efficiently storing branch prediction information while still providing the advantages of a physically-tagged instruction cache is therefore desired.

SUMMARY OF THE INVENTION

The problems outlined above are in large part solved by a microprocessor in accordance with the present invention. The microprocessor employs a branch prediction unit including a branch prediction storage which stores the index portion of branch target addresses and an instruction cache which is virtually indexed and physically tagged. The branch target index (if predicted-taken, or the sequential index if predicted not-taken) is provided as the index to the instruction cache. The selected physical tag is provided to a reverse translation lookaside buffer (TLB) which translates the physical tag to a virtual page number. Concatenating the virtual page number to the virtual index from the instruction cache (and the offset portion, generated from the branch prediction) results in the branch target address being generated. Advantageously, a physically tagged cache and a branch prediction structure which stores indexes only is used and the branch target address is still generated correctly. By allowing for storing only indexes in the branch prediction storage, the branch prediction storage may be made smaller (i.e. occupy less semiconductor substrate area). The storage may be accessed more rapidly due to its smaller size, and manufacturing costs for the microprocessor may be reduced due to the reduced area of the storage.

In one embodiment, the process of reading an index from the branch prediction storage, accessing the instruction cache, selecting the physical tag, and reverse translating the physical tag to achieve a virtual page number may require more than a clock cycle to complete. Such an embodiment may employ a current page register which stores the most recently translated virtual page number and the corresponding real page number. The branch prediction unit predicts that each fetch address will continue to reside in the current page and uses the virtual page number from the current page to form the branch target address. The physical tag from the fetched cache line is compared to the corresponding real page number to verify that the fetch address is actually still within the current page. When a mismatch is detected between the corresponding real page number and the physical tag from the fetched cache line, the branch target address is corrected with the linear page number provided by the reverse TLB and the current page register is updated. Advantageously, single cycle branch target address generation may still be performed as long as instruction fetching remains within the same page.

Broadly speaking, the present invention contemplates a microprocessor comprising an instruction cache and a branch prediction unit. The instruction cache is configured to receive a first virtual index and to store a plurality of physical tags. In response to the first virtual index, the instruction cache is configured to select at least one of the plurality of physical tags. Coupled to the instruction cache, the branch prediction unit includes a current page register coupled to receive a virtual page number and a corresponding physical page number from a translation lookaside buffer (TLB) included in the branch prediction unit. The branch prediction unit is configured to form a branch target address for a branch instruction from the first virtual index and the virtual page number from the current page register.

The present invention further contemplates a branch prediction unit comprising a branch prediction control unit and a current page register. The branch prediction control unit is configured to generate a first branch target address corresponding to a branch instruction. The first branch target address comprises a virtual address. The current page register is configured to store a current linear page number and a corresponding current physical page number corresponding to a second branch target address generated by the branch control unit prior to generating the first branch target address. The branch prediction control unit is configured to use the current virtual page number to generate the first branch target address.

Moreover, the present invention contemplates a method for predicting a branch target address. A current virtual page number and a corresponding current physical page number are stored responsive to a first fetch address within a page corresponding to the current virtual page number and the current physical page number. A branch prediction index is selected from a branch prediction storage in response to a second fetch address. The branch target address is formed from the current virtual page number and the branch prediction index.

BRIEF DESCRIPTION OF THE DRAWINGS

Other objects and advantages of the invention will become apparent upon reading the following detailed description and upon reference to the accompanying drawings in which.

Figure 1:
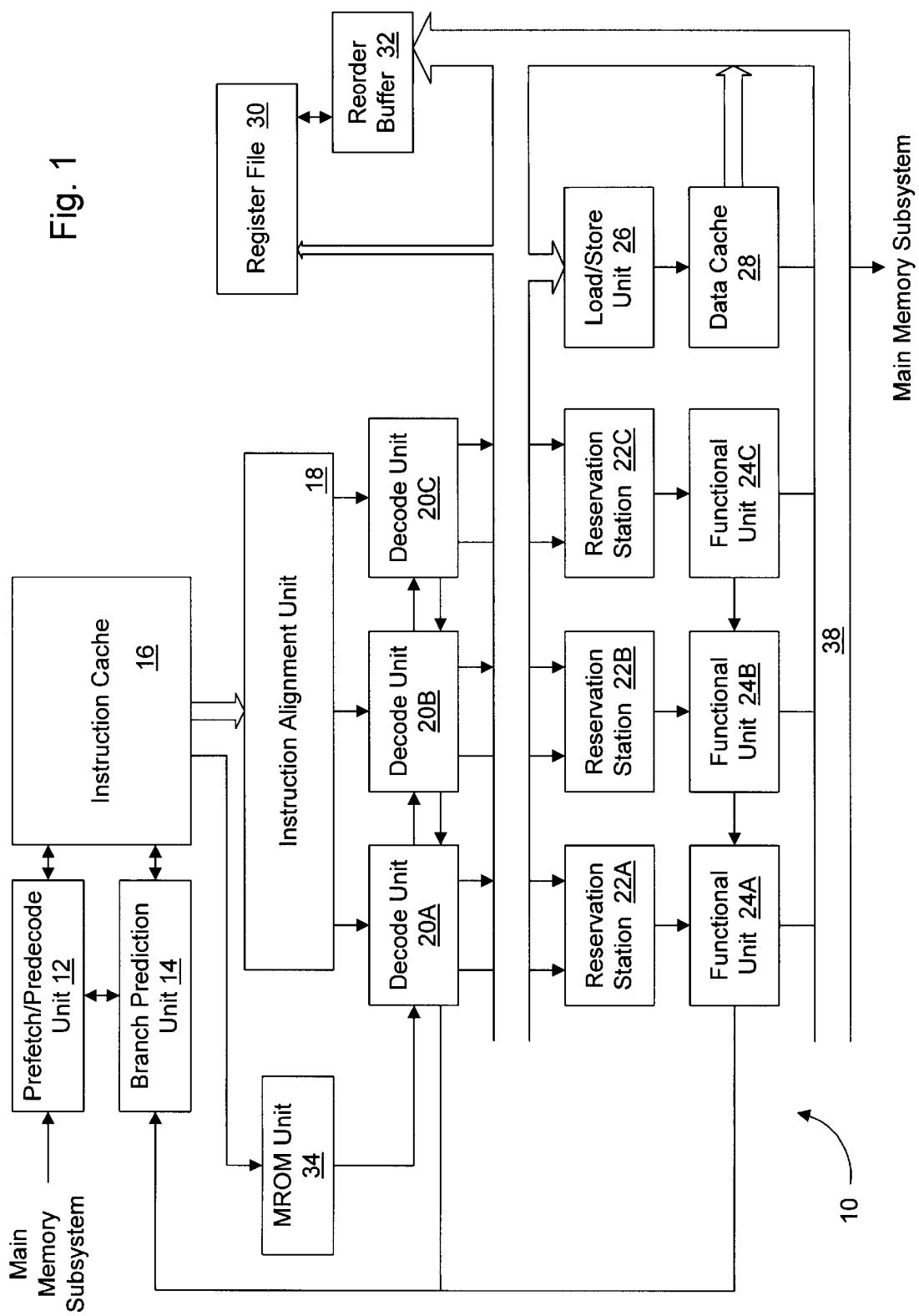
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, instruction cache 16 is virtually indexed and physically tagged. By using physical tagging, invalidation of cache lines due to TLB flushing may be avoided. Branch prediction unit 14 includes a TLB for translating a virtual fetch address formed therein (using branch prediction information corresponding to the cache line fetched in the preceding clock cycle). The index portion of the virtual fetch address is provided to instruction cache 16, and the virtual address is translated to a physical address using a TLB included in branch prediction unit 14. A real page number corresponding to the virtual address is thereby generated and may be used to determine if a hit in instruction cache 16 is detected. Additionally, the physical tag of the selected cache line is provided by instruction cache 16 to a reverse TLB structure for translation into a virtual page number. The virtual page number is provided (concatenated with the virtual index) as the branch target address corresponding to the branch instruction. Advantageously, the branch prediction storage within branch prediction unit 14 may store only the index (and offset) portions of the branch target address and a full virtual branch target address may still be generated by using the reverse translation structure.

In one embodiment, the reverse translation is not completed in the same clock cycle as the branch target cache line is fetched. Therefore, branch prediction unit 14 may employ a current page register which stores a current real page number and a corresponding current virtual page number. The current real page number and current virtual page number correspond to the page from which instruction fetching has been occurring in previous clock cycles. Branch prediction unit 14 predicts that subsequent instruction fetching will continue within the current page, and provides the current virtual page number (concatenated with the virtual index) as the branch target address. The physical tag read in response to the virtual index is compared to the current real page number to verify that the fetched cache line is actually still within the current page. If a mismatch occurs, the branch target address previous provided from the current virtual page number is cancelled and the reverse TLB provides the correct virtual page number for the branch instruction. Additionally, the current page register is updated so that subsequent instruction fetches assume the new page. Advantageously, the branch target address may still be generated in the same clock cycle as the fetching of the branch target unless the page from which instructions are being fetched changes.

In one embodiment, microprocessor 10 employs the x86 microprocessor architecture The x86 microprocessor architecture specifies a two level translation in which a logical address is formed using instruction operands. Additionally, the instruction either explicitly or implicitly specifies a segment corresponding to the instruction as yet another operand. A segment translation mechanism is used to translate the logical address to a linear address. Specifically, a segment base address corresponding to the specified segment is added to the logical address to produce the linear address. Subsequently, the linear address is translated to a physical address. For the remainder of this specification, the linear address and the physical address will be referred to. It is understood, however, that a virtual address may be used in a similar fashion as the linear address is used in the ensuing text.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 4 way set associative structure having 32 byte lines (a byte comprises 8 binary bits). Alternatively, 2 way set associativity may be employed. Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

Start bits 10000
End bits 00001
Functional bits 11000

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being Fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are convey d to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results; from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

Figure 2:
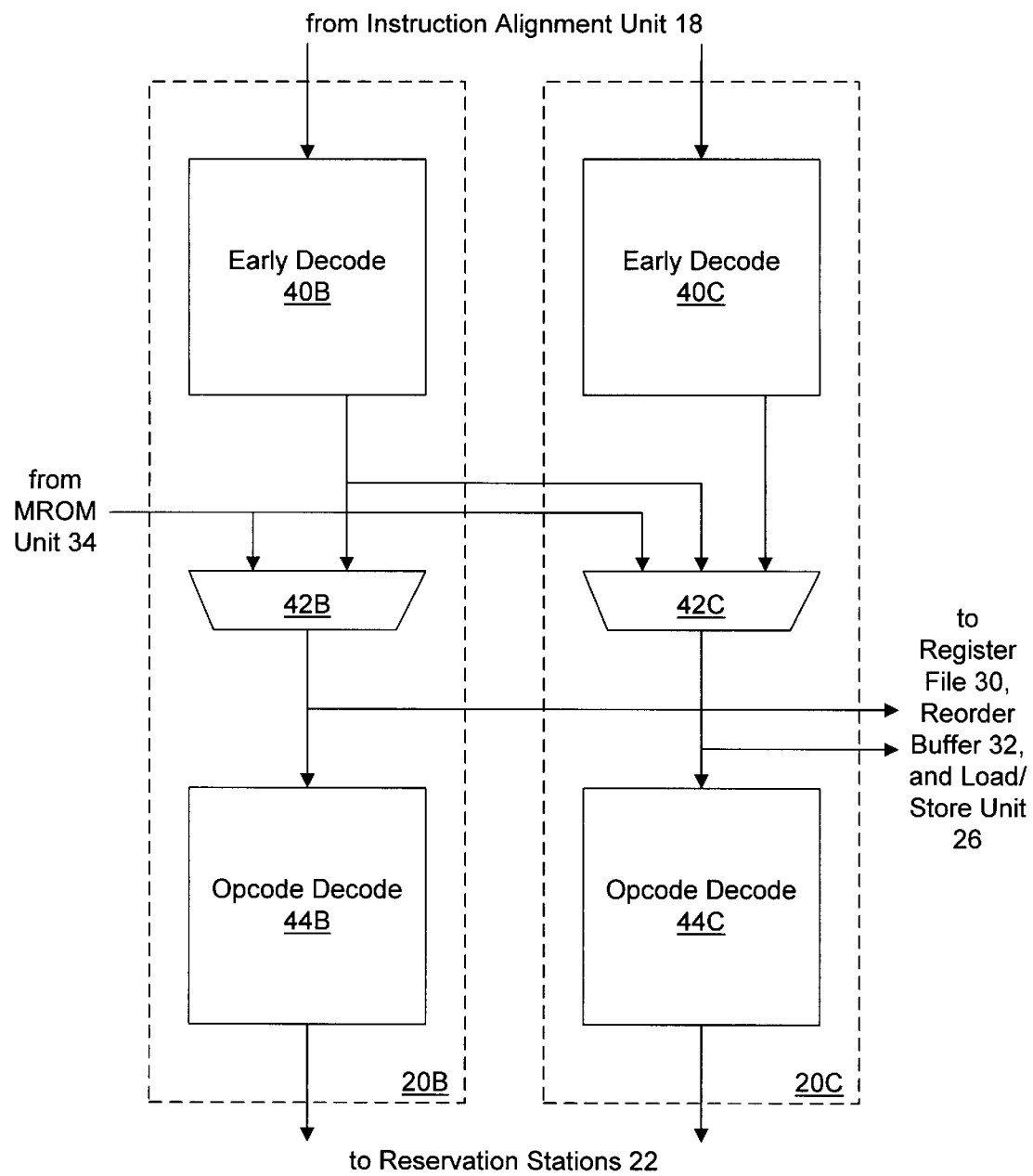
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations.

(i) merge the prefix bytes of the instruction into an encoded prefix byte;

(ii) decode unconditional branch instructions (which nay include the unconditional jump, the CALL, and the RETURN) which were not detected during branch prediction;

(iii) decode source and destination flags;

(iv) decode the source and destination operands which are register operands and generate operand size information, and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
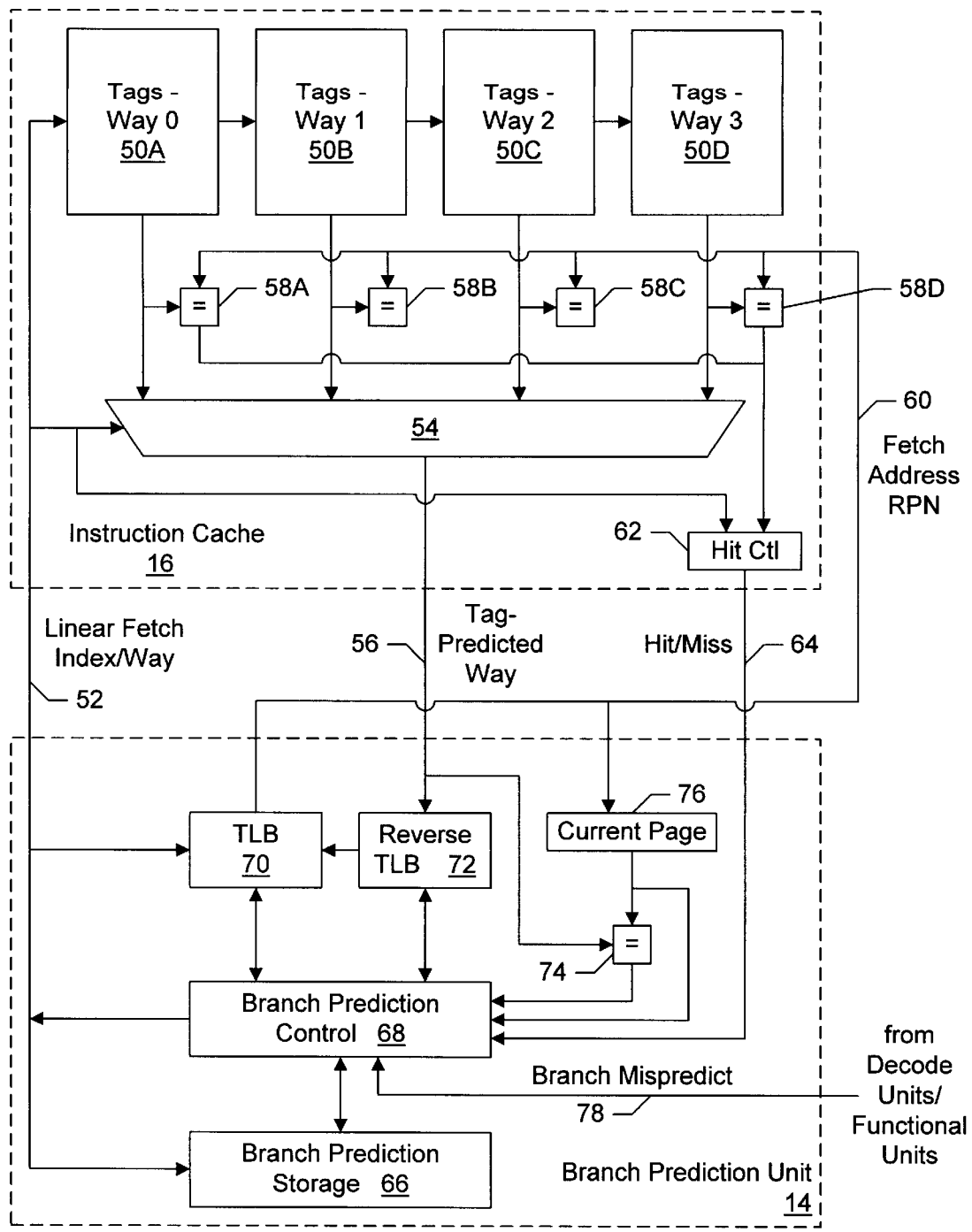
FIG. 3 is a more detailed block diagram illustrating one embodiment of a portion of the instruction cache shown in FIG. 1 and one embodiment a portion of the branch prediction unit shown in FIG. 1.

Turning now to FIG. 3, a block diagram of a portion of one embodiment of branch prediction unit 14 and a portion of one embodiment of instruction cache 16 is shown. Other embodiments are possible and contemplated. As shown in FIG. 3, instruction cache 16 includes a tag storage comprising a tags—way 0 storage 50A, a tag—way 1 storage 50B, a tags—way 2 storage 50C, and a tags—way 3 storage 50D. Each of storages 50A–50D receives an input index from linear fetch index/way bus 52 and provides an output to a multiplexor (mux) 54. Mux 54 receives a way prediction from linear fetch index/way bus 52 as a selection control, and provides the selected output on a tag—predicted way bus 56. Additionally, the output of each storage 50A–50D is coupled to a respective comparator 58A–58D. Comparators 58A–58D are further coupled to receive a fetch address real page number upon a fetch address RPN bus 60. Comparators 58A–58D are further coupled to a hit control unit 62. Hit control unit 62 is coupled to linear fetch index/way bus 52 and to a hit/miss bus 64. Branch prediction unit 14 includes a branch prediction storage 66 coupled to linear fetch index/way bus 52 and to a branch prediction control unit 68. Branch prediction control unit 68 is coupled to a branch mispredict bus 78 from decode units 20 and functional units 24 as well as linear fetch index/way bus 52. Still further, branch prediction control unit 68 is coupled to a TLB 70, a reverse TLB 72, hit/miss bus 64, a comparator 74, and a current page register 76. TLB 70 is coupled to linear fetch index/way bus 52, reverse TLB 72, and fetch address RPN bus 60. Reverse TLB 72 is coupled to tag—predicted way bus 56. Similarly, comparator 74 is coupled to tag—predicted way bus 56 and is further coupled to current page register 76. Current page register 76 is coupled to fetch address RPN bus 60.

Branch prediction storage 66 stores branch predictions for use in predicting the fetch addresses of an instruction fetch stream. In addition to a taken-not taken prediction, branch prediction storage 66 stores the index and offset portion of a branch target address corresponding to a branch instruction within a cache line, as well as a predicted way for the branch target. Branch prediction unit 14 is designed to predict that the cache line corresponding to the index and predicted way is storing the branch target, and therefore forms the branch target address by concatenating the linear page number corresponding to the cache line to the index stored in branch prediction storage 66. The mechanism for obtaining a linear page number corresponding to a physical tag is described below.

Branch prediction unit 14 therefore assumes a cache hit for the target of a branch instruction, and a misprediction occurs if the target is actually a cache miss (i.e. the predicted branch target address and the actual branch target address mismatch). For sequential instruction fetches and for branch mispredictions or other redirections of instruction fetching, the cache hit is verified by translating through TLB 70 and comparing the physical tags using comparators 58A–58D. A sequential fetch address is selected if the branch prediction selected in response to the current fetch address indicates not-taken. The sequential fetch address is formed by incrementing the current fetch address by the number of bytes being fetched in the current clock cycle. The way prediction for a sequential fetch may be stored in the branch prediction, or may be assumed to be the same as the currently predicted way.

Generally, branch prediction control unit 68 provides a linear fetch index and a predicted way upon linear fetch index/way bus 52 to instruction cache 16. The linear index selects a row in each of storages 50A–50D, which provide the information stored in that row to mux 54. Storages 50A–50D collectively are the tag storage of instruction cache 16, and therefore store the physical tags corresponding to each cache line stored in instruction cache 16 along with cache line state information (e.g. valid/invalid). Each of storages 50A–50D correspond to a different way of instruction cache 16, and therefore the tags corresponding to the indexed row (one from each way) are provided to mux 54. Mux 54 selects one of the tags using the predicted way provided by branch prediction unit 14 and thereby provides a physical tag upon tag—predicted way bus 56. The physical tag provided upon tag—predicted way bus 56 is provided to reverse TLB 72, which maps the physical tag to a corresponding virtual page number. The virtual page number is concatenated with the linear fetch index (and the offset provided from the branch prediction storage) to generate the branch target address. Advantageously, the linear branch target address may still be generated even though only indexes are stored in branch prediction storage 66 and instruction cache 16 is physically tagged.

In addition to fetching instruction bytes from instruction cache 16, the linear index and way are provided to branch prediction storage 66. The linear index and way select a branch prediction entry storing branch prediction information corresponding to the instruction bytes being fetched. Branch prediction control unit 68 uses the branch prediction information to generate a subsequent fetch address. More particularly, the linear fetch index for the subsequent clock cycle is generated from the branch prediction information, and may be the branch prediction index stored in the branch prediction entry. Alternatively, a sequential prediction may be made and the subsequent linear fetch index may comprise an increment of the current linear fetch index.

Reverse TLB 72 translates from a real page number to a corresponding linear page number (i.e. in the opposite direction that translations are typically performed—from a linear page number to a corresponding physical page number). Since instruction cache 16 is linearly indexed but physically tagged, the physical tag comprises a real page number instead of only the non-index portion of the real address.

TLB 70 translates from a linear page number to a corresponding physical page number. TLB 70 therefore receives the complete linear fetch address, not just the index. As will be described below, the complete fetch address is predicted using the linear fetch index and the current linear page number stored in current page register 76. TLB 70 provides the real page number corresponding to the fetch address to comparators 58A–58D, which receive the physical tags selected from storages 50A–50D according to the corresponding linear index. The results of the comparisons are provided to hit control unit 62, along with the predicted way from linear fetch index/way bus 52. Hit control unit 62 determines whether or not a hit in instruction cache 16 is detected, and whether or not a hit in the predicted way is detected. The hit/miss status for the cache and the hit/miss status for the predicted way are provided to branch prediction unit 14 upon hit/miss bus 64. Additionally, the way in which the hit is detected is provided upon hit/miss bus 64.

Branch prediction control unit 68 continues fetching subsequent predicted fetch addresses if a hit in the predicted way is detected. If a hit in an unpredicted way occurs (i.e. miss in the predicted way but still a hit in the cache), then branch prediction control unit 68 may recycle the linear fetch index with the correct way upon linear fetch index/way bus 52. A branch prediction corresponding to the correct way at that linear fetch index is thereby fetched from branch prediction storage 66 and the correct instruction bytes are fetched from instruction cache 16. Additionally, the branch prediction which generated the incorrect way prediction is updated to the correct way. If a cache miss is detected, then branch prediction control unit 68 stalls until the missing cache line is fetched (or until a branch misprediction is detected by decode units 20 or functional units 24, causing instruction fetch to proceed with a different address).

Since instruction cache 16 is linearly indexed, it is possible for a particular fetch to miss instruction cache 16, but the corresponding instruction bytes may still be stored in instruction cache 16. Different linear page numbers can be alias d to the same physical page (i.e. each of the linear page numbers has a translation to the same physical page). If the different linear page numbers which are aliased differ in bits which are used to index instruction cache 16, the instruction bytes corresponding to a particular fetch address may be stored within instruction cache 16 at a different index. Microprocessor 10 may maintain a set of physically indexed tags which map the physical tags stored in instruction cache 16 to a linear index and way of instruction cache 16. Aliasing may be detected by providing a missing physical address (from TLB 70) to the set of physically indexed tags. If a hit is detected, the cache line may be copied to a way within the linear index which missed. The cache tag at which the cache line was formerly stored (i.e. the source of the copy) may be invalidated such that only one copy of the cache line is stored in instruction cache 16. Alternatively, the same instruction cache line may be allowed to be stored in more than one cache location within instruction cache 16.

The amount of time required to transmit a linear fetch index and way to instruction cache 16, fetch a set of physical tags from storages 50A–50D, select one of the physical tags via mux 54, and access reverse TLB 72 to obtain a linear page number may be longer than a clock cycle. In order to provide a branch target address for instructions being fetched and to provided a linear address to be translated by TLB 70 to provide a physical page number for detecting cache hit/miss, branch prediction unit 14 may employ a current page register 76. Current page register 76 stores the most recently translated linear page number and the corresponding physical page number from TLB 70. Branch prediction unit 14 predicts each clock cycle that the linear fetch address presented during the clock cycle is within the most recently translated linear page. Therefore, the linear fetch address and branch target address are predicted to be within the linear page number stored in current page register 76. Branch prediction unit 14 verifies that the physical tag provided by instruction cache 16 (from the predicted way) matches the physical page number stored in current page register 76 using comparator 74. If the physical tag and the physical page number in current page register 76 mismatch, then the predicted linear fetch address and branch target address are cancelled. The linear page number provided by reverse TLB 72 is concatenated with the linear index to form the branch target address. Additionally, current page register 76 is updated with the real page number and corresponding linear page number.

When the branch target address is cancelled in favor of a branch target address provided by the reverse translation, the instructions corresponding to the branch target address may be stalled such that the correct branch target address; is provided along with the instructions to a subsequent stage in the instruction processing pipeline. However, the linear fetch index and way predicted in response to the branch target address being used as a fetch address may still access instruction cache 16 and branch prediction storage 66, thereby generating a subsequent fetch index and predicted way from branch prediction storage 66 and allowing for single cycle fetching to continue after the one cycle stall, presuming that subsequent fetching continues with the new page Branch mispredictions are indicated via branch mispredict bus 78. In one embodiment, branch prediction information corresponding to each fetch is stored in a buffer by branch prediction control unit 68 along with the fetch index and way, and a branch tag is assigned to each cache line fetched. The branch tag of a mispredicted fetch is provided upon branch mispredict bus 78. Additionally, the correct branch target address (a linear address) is provided. Branch prediction control unit 68 may update branch prediction storage 66 and provide the linear address as a fetch address. To update branch prediction storage 66, the way of instruction cache 16 in which the correct branch target address hits is determined by providing the correct branch target address as a fetch address and determining in which way a hit occurs (using TLB 70 and comparators 58A–58D).

It is noted that TLB 70 and reverse TLB 72 may experience a miss for a fetch address. A miss in the TLBs causes a stall in instruction fetching, while the translation tables are searched for a translation. If no translation is found, an instruction translation exception may be signalled. Furthermore, since reverse TLB 72 is used to translate from a physical address to a linear address and aliasing of linear addresses is possible, TLB 70 and reverse TLB 72 are configured to store at most one translation (corresponding to each real page number. In this manner, at most one linear page number is provided from reverse TLB 72 for any one real page number. Reverse TLB 72 may be implemented as a content-addressable memory (CAM) structure which stores real page numbers and is associatively searched for a hit. When reloading TLB 70 and reverse TLB 72 (i.e. when caching a new translation therein), the real page number from the new translation may be provided as an input to reverse TLB 72. If a hit is detected, the corresponding translation is invalidated in both TLB 70 and reverse TLB 72.

In one particular embodiment, a number of bytes less than a cache line are fetched in a clock cycle. For example, 32 byte cache lines may be implemented but 16 byte half-cache lines may be fetched. Sequential fetch addresses may therefore access the same cache line twice. Additionally, branch prediction storage 66 stores branch prediction information on the basis of the number of bytes fetched. Therefore, when fetching 16 byte half cache lines, two branch prediction storage locations within branch prediction storage 66 are allocated to each cache line (one for each half cache line). The index to branch prediction storage 66 therefore includes more bits than instruction cache 16 uses, and the additional bits are less significant bits of the address than those used in the instruction cache index.

As an example, a 64 kilobyte, 4 way set associative instruction cache employing 32 byte cache lines may be employed. Linear and physical addresses may both be 32 bits, and a page may be 4 kilobytes (i.e. bits 11 to 0 of the address are not translated between linear and physical addresses). Since there are 4 cache lines of 32 bytes, or 128 bytes, per row of the instruction cache, there are 512 rows. Nine bits of the linear address are used for indexing the instruction cache. The least significant 5 (i.e. bits 4 to 0) are the offset within the cache line. Therefore, the index may be bits 13 to 5. The physical tags comprise bits 31 to 12 of the physical address (bits 13 and 12 are stored even though these bits are part of the index because these bits are translated from linear to physical). When concatenating the linear page number to the branch prediction index to form the branch target address, bits 13 and 12 of the linear page number are dropped in favor of the corresponding branch prediction index bits. However, bits 13 and 12 of the linear page number should match bits 13 and 12 of the branch prediction index.

Figure 4:
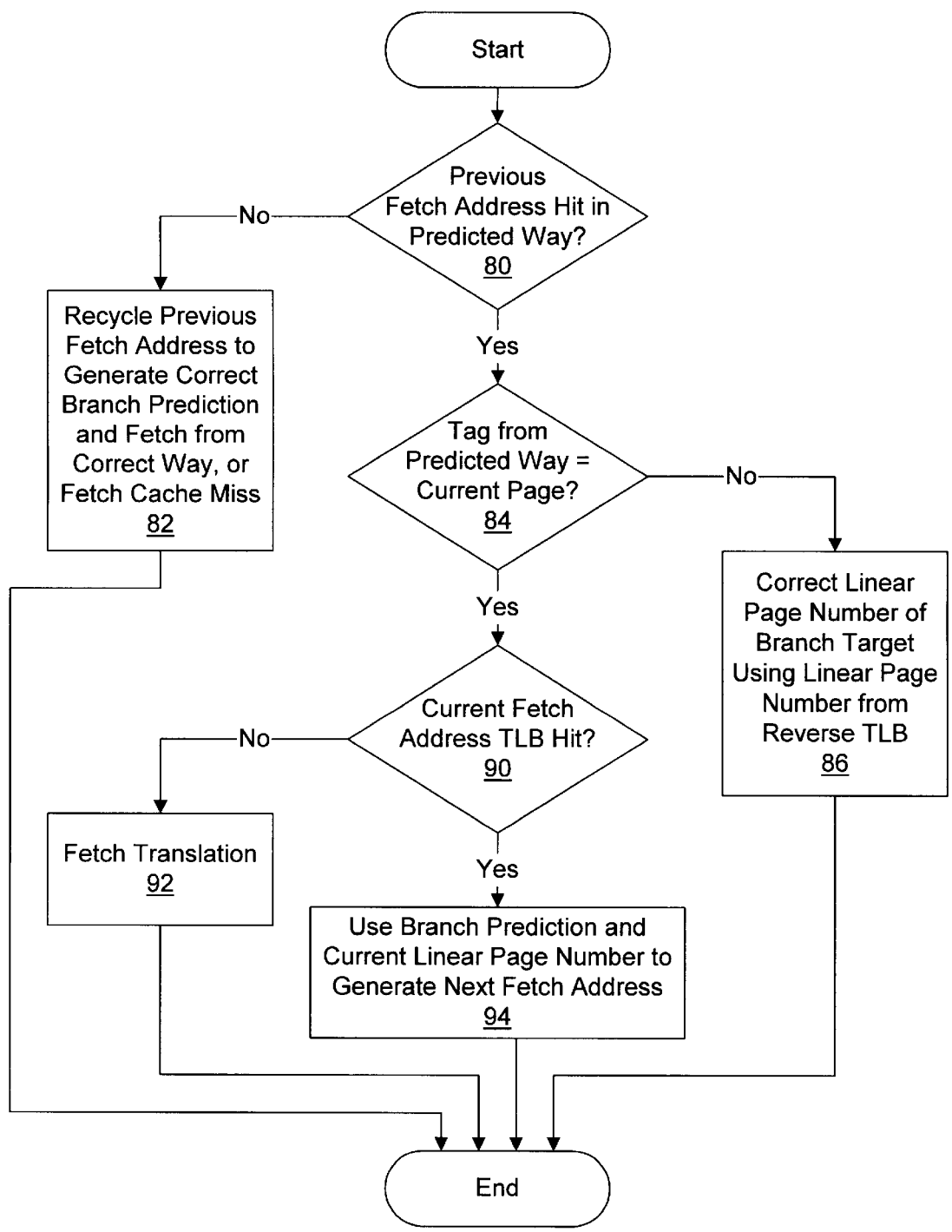
FIG. 4 is a flow chart illustrating operation of one embodiment of a branch prediction control unit shown in FIG. 3.

Turning now to FIG. 4, a flowchart illustrating operating of one embodiment of branch prediction control unit 68 is shown. Branch prediction control unit 68 may perform the steps shown in FIG. 4 during each clock cycle. While shown serially for ease of understanding, it is noted that the steps shown in FIG. 4 may be performed in parallel by the logic within branch prediction control unit 68, and may be performed in any suitable order.

Branch prediction control unit 68 determines if the fetch address from the preceding clock cycle is a hit in the predicted way (as signalled from instruction cache 16 via hit/miss bus 64—decision block 80). If the previous fetch address misses in the predicted way, then the branch prediction used to form the current fetch address (i.e. the fetch address that would otherwise access instruction cache 16 during the current clock cycle) was incorrect. The previous fetch address is recycled during the current clock cycle to select the correct branch prediction information by fetching the branch prediction corresponding to the hitting way (step 82). Alternatively, if a cache miss is detected then the cache line is fetched (the set of physical tags may be examined for potential aliasing as described above).

If the previous fetch address hits in the predicted way (which is assumed for non-sequential branch predictions), then branch prediction control unit determines if the tag provided by instruction cache 16 for the current fetch address upon tag—predicted way bus 56 is within the current page stored in current page register 76 (decision block 84). If not, then the linear page number of the branch target address identifying the cache line is incorrect. The linear page number provided by reverse TLB 72 in response to the physical tag provided by instruction cache 16 is used to correct the branch target address (step 86). It is noted that the correction of the branch target address may occur in a subsequent clock cycle.

If the tag from the predicted way is within the current page, branch prediction control unit 68 determines if the current fetch linear address is a hit in TLB 70 (decision block 90). If the current fetch linear address misses in TLB 70, branch prediction control unit 68 fetches the translation and reloads the translation into TLB 70 and reverse TLB 72 (step 92). The fetch is repeated after the TLB reload occurs.

If the current fetch linear address is a hit in TLB 70, the branch prediction from branch prediction storage 66 which corresponds to the current fetch address and the current linear page number from current page register 76 is used to generate the next fetch address (step 94).

Figure 5:
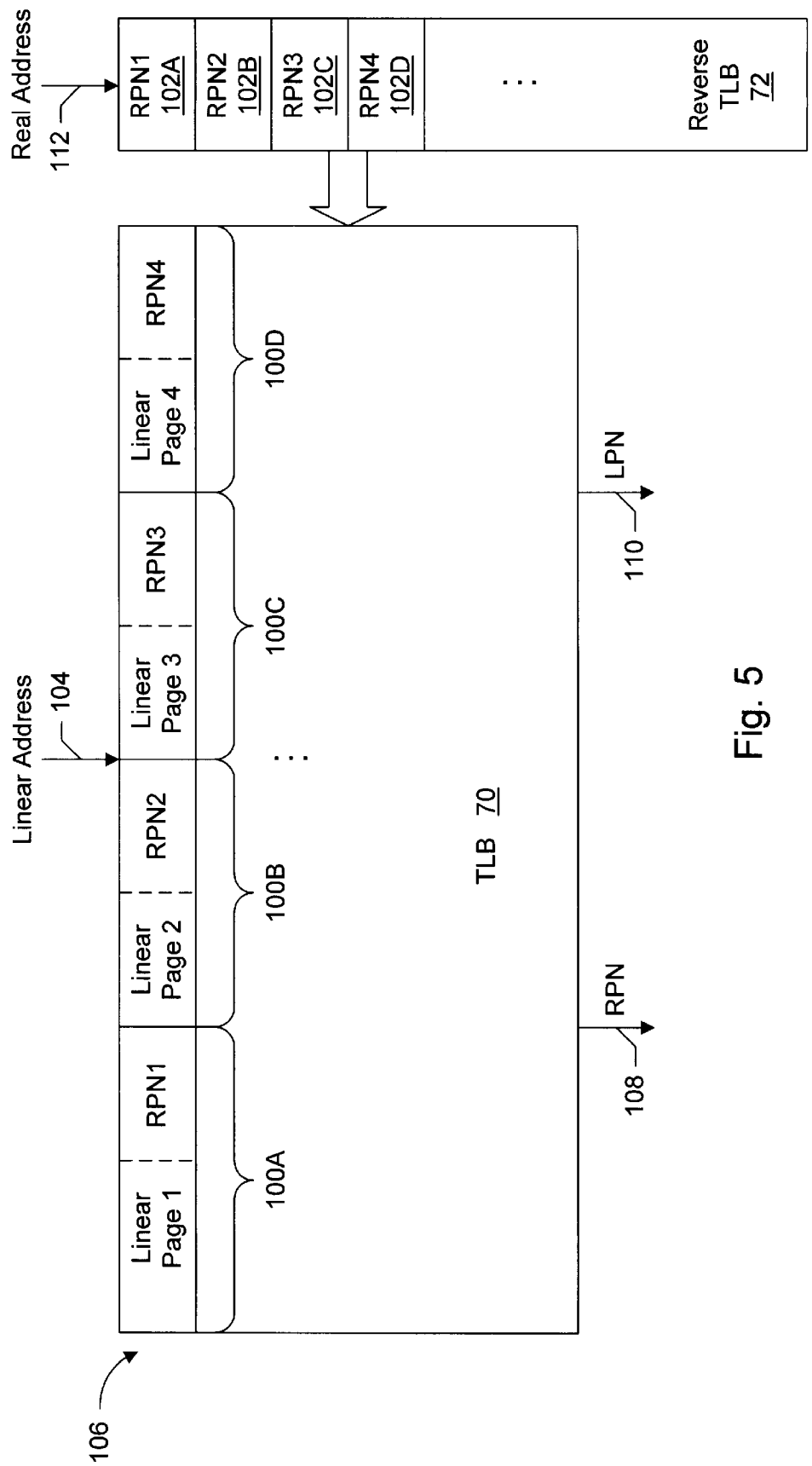
FIG. 5 is a diagram illustrating one embodiment of a translation lookaside buffer (TLB) and one embodiment of a reverse TLB in greater detail.

Turning next to FIG. 5, a block diagram of one embodiment of TLB 70 and reverse TLB 72 is shown. Other embodiments are possible and contemplated. TLB 70 as shown in FIG. 5 is organized as a 4 way set associative storage of translations. Therefore, each row of TLB 70 includes four translation entries (e.g. entry 100A including linear page 1 and the corresponding real page number RPN1, entry 100B including linear page 2 and the corresponding real page number RPN2, entry 100C including linear page 3 and the corresponding real page number RPN3, and entry 100D including linear page 4 and the corresponding real page number RPN4). It is noted that each entry 100A–100D may store translation attributes (e.g. protection information, etc.) as well. Furthermore, a valid bit is stored for each entry 100A–100D to indicate the validity of the entry.

When TLB 70 receives a linear address 104, a row of TLB 70 is selected using an index derived from the linear address (similar to indexing instruction cache 16). For example, row 106 includes entries 100A–100D. The number of rows within TLB 70 may be kept small in order to provide rapid access. For example, 8 or 16 rows may be suitable. The linear page numbers within the selected row are compared to the corresponding portion of linear address 104, and if a hit is detected the corresponding real page number is provided as RPN 108. RPN 108 may, for example, be transmitted on fetch address RPN bus 60.

Reverse TLB 72 is implemented as set of real page number entries (e.g. entries 102A–102D). Each entry within reverse TLB 72 corresponds to an entry within TLB 70. For example, entry 102A corresponds to entry 100A, entry 102B corresponds to entry 100B, etc. A fully associative compare may be performed upon the entries of reverse TLB 72 to determine which entry within TLB 70 is storing the corresponding linear page number. Hit information from the associative compare may be used to select the corresponding linear page number from TLB 70, (i.e. output as LPN 110 in response to real address 112) and hence the reverse translation from real page number to linear page number may be performed. A suitable structure for reverse TLB 72 may therefore by a CAM, with the match line from each entry 102A–102D enabling a particular linear page number from an entry 100A–100D to be conveyed as LPN 110.

Alternatively, reverse TLB 72 may store the linear page numbers as well as the real page numbers, and may therefore be built as a separate structure from TLB 70. Reverse TLB 72 would then receive real address 112 and provide a linear page number 110 in response to a hit on a particular entry. However, it may still be desirable to invalidate a translation alias in TLB 70 when reloading a translation into TLB 70 and reverse TLB 72 using a real page number match provided by searching reverse TLB 72.

Figure 6:
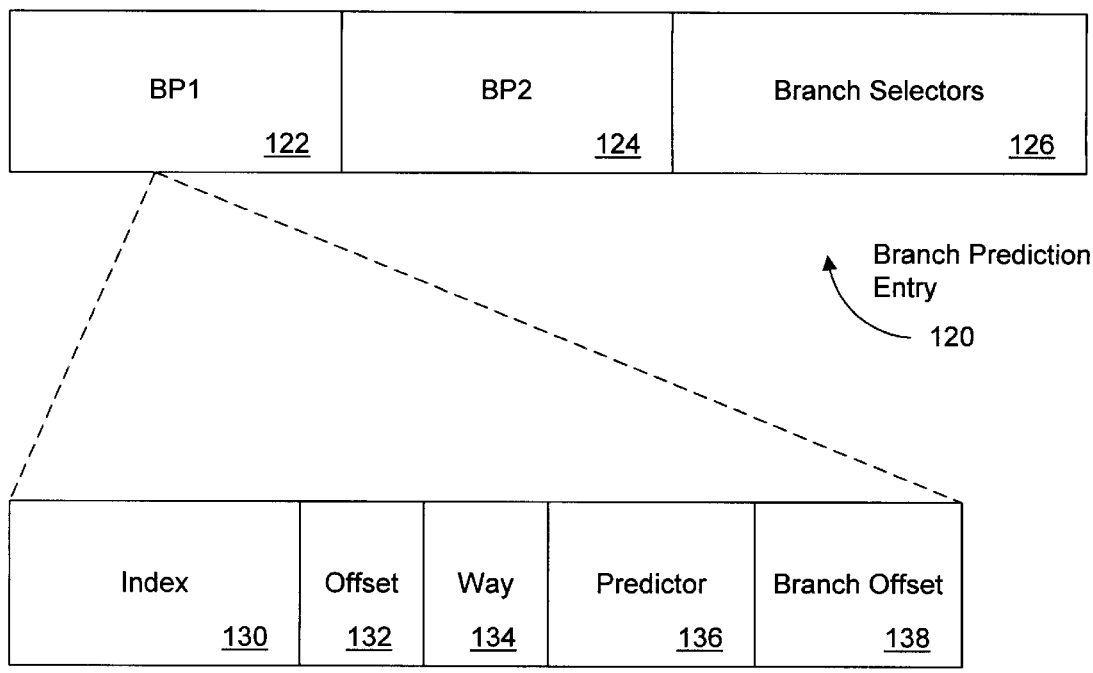
FIG. 6 is a diagram illustrating an exemplary branch prediction entry which may be employed by one embodiment of the branch prediction unit illustrated in FIGS. 1 and 3.

Turning now to FIG. 6, a block diagram illustrating an exemplary branch prediction entry 120 which may be fetched from one embodiment of branch prediction storage 66 in response to a linear fetch index and way prediction is shown. Branch prediction entry 120 includes a first branch prediction field 122, a second branch prediction field 124, and a branch selector field 126. First branch prediction field 122 is shown in exploded view, and second branch prediction field 124 may be configured to store similar information.

Branch selectors field 126 stores a set of branch selectors. In one embodiment, branch selectors field 126 includes a branch selector corresponding to each byte within the cache line (or portion thereof) fetched when branch prediction entry 120 is fetched. In another embodiment, a branch selector corresponding to each 2 bytes within the cache line (or portion thereof) fetched when branch prediction entry 120 is fetched. One branch selector may be stored for each two bytes because branch instructions (with the exception of the return instruction) include at least two bytes in the x86 microprocessor architecture employed by one embodiment of microprocessor 10. Generally, the branch selector corresponding to the offset of the fetch address is selected to indicate which branch prediction should be selected for forming a subsequent fetch address. The branch selector stored at a particular byte indicates selection of a branch prediction corresponding to the branch instruction which is subsequent to the particular byte in program order and which is prior to any other branch instructions which are subsequent to the particular byte. If no branch instructions are subsequent to the particular byte within the cache line (or portion thereof) fetched when branch prediction entry 120 is fetched, the sequential prediction is made. In one embodiment, each branch selector is two bits encoded as follows (in binary): '00' is sequential, '01' is a return stack entry (a return stack stores return addresses corresponding to previously fetched call instructions), '10' is the first branch prediction stored in first branch prediction field 122, and '11' is the second branch prediction stored in second branch prediction field 124. In one specific embodiment, 16 bytes of a 32 byte cache line are fetched when branch prediction entry 120 is fetched. Therefore, 16 branch selectors may be stored (if one branch selector is stored per byte) or 8 branch selectors may be stored (if one branch selector is stored per 2 bytes).

First branch prediction field 122, as shown in the exploded view in FIG. 6, includes a target index field 130, a target offset field 132, a way field 134, a predictor field 136, and a branch offset field 138.

Target index field 130 stores the index portion of the target address of the branch instruction predicted by first branch prediction field 122. As mentioned above the target index is a linear index. Similarly, the cache line offset of the branch target address is stored in target offset field 132. The target offset field may be used to select which instruction bytes are actually being fetched when the first branch prediction is used as a fetch address. The way of the instruction cache is predicted using the value stored in way field 134. The predicted way may be verified by comparing the target address of the branch instruction (when executed) to the tag from the predicted way concatenated with the index and offset from target address field 132. If the predicted way is incorrect (i.e. the target address generated by executing the branch instruction does not match the predicted target address), the branch instruction is treated as mispredicted and the target address is used to fetch instructions from the instruction cache. The correct way is determined and is updated into the branch prediction. Alternatively, the entire target address may be stored and the way determined by comparing the instruction cache tag portion of the target address with the to tags in the indexed cache line. Way field 134 may be eliminated for such an embodiment.

Predictor field 136 stores a branch predictor used to determine the taken/not taken prediction for the branch instruction corresponding to first branch prediction field 122. For example, predictor field 136 may comprise a saturating counter which is incremented each time the branch instruction is taken and decremented each time the branch instruction is not taken. The saturating counter may saturate at a maximum value (such that further increments have no effect) and a minimum value (such that further decrements have no effect). The most significant bit may be used as the taken/not taken prediction (taken if a binary one, not taken if a binary zero). In one particular embodiment, the branch predictor is a two bit value saturating at 11 (maximum value, in binary) and 01 (minimum value, in binary).

Branch offset field 138 records the offset of the branch instruction corresponding to first branch prediction field 122 within the cache line including the branch instruction. It is noted that branch prediction entry 120 may further include a sequential way prediction for use if the sequential fetch address is predicted. As used herein, the term "sequential", when referring to branch predictions, refers to selecting a fetch address which accesses a group of bytes contiguous to the group of bytes being fetched. The sequential fetch address is numerically larger than the current fetch address.

Figure 7:
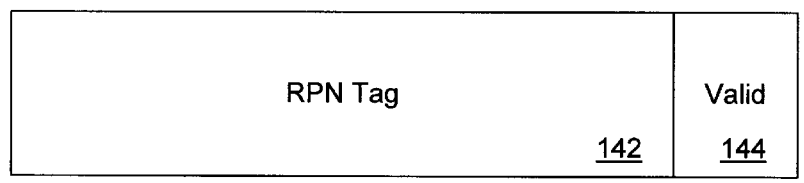
FIG. 7 is a diagram illustrating one embodiment of a cache tag which may be employed by one embodiment of the instruction cache shown in FIGS. 1 and 3.

Turning next to FIG. 7, a block diagram of an exemplary tag entry 140 which may be employed by one embodiment of storages 50A–50D. Tag entry 140 includes an RPN tag field 142 and a valid field 144. RPN tag field 142 stores the real page number of the cache line corresponding to tag entry 140. RPN tag field 142 may store one or more bits which corresponding to index bits to instruction cache 16, where the one or more bits are part of the linear page number and are therefore translated. Valid field 144 includes an indication whether or not the cache line corresponding to tag entry 140 is valid (i.e. storing bytes). For example, valid field 144 may comprise a bit indicative, when set, of validity and indicative, when clear, of invalidity.

Figure 8:
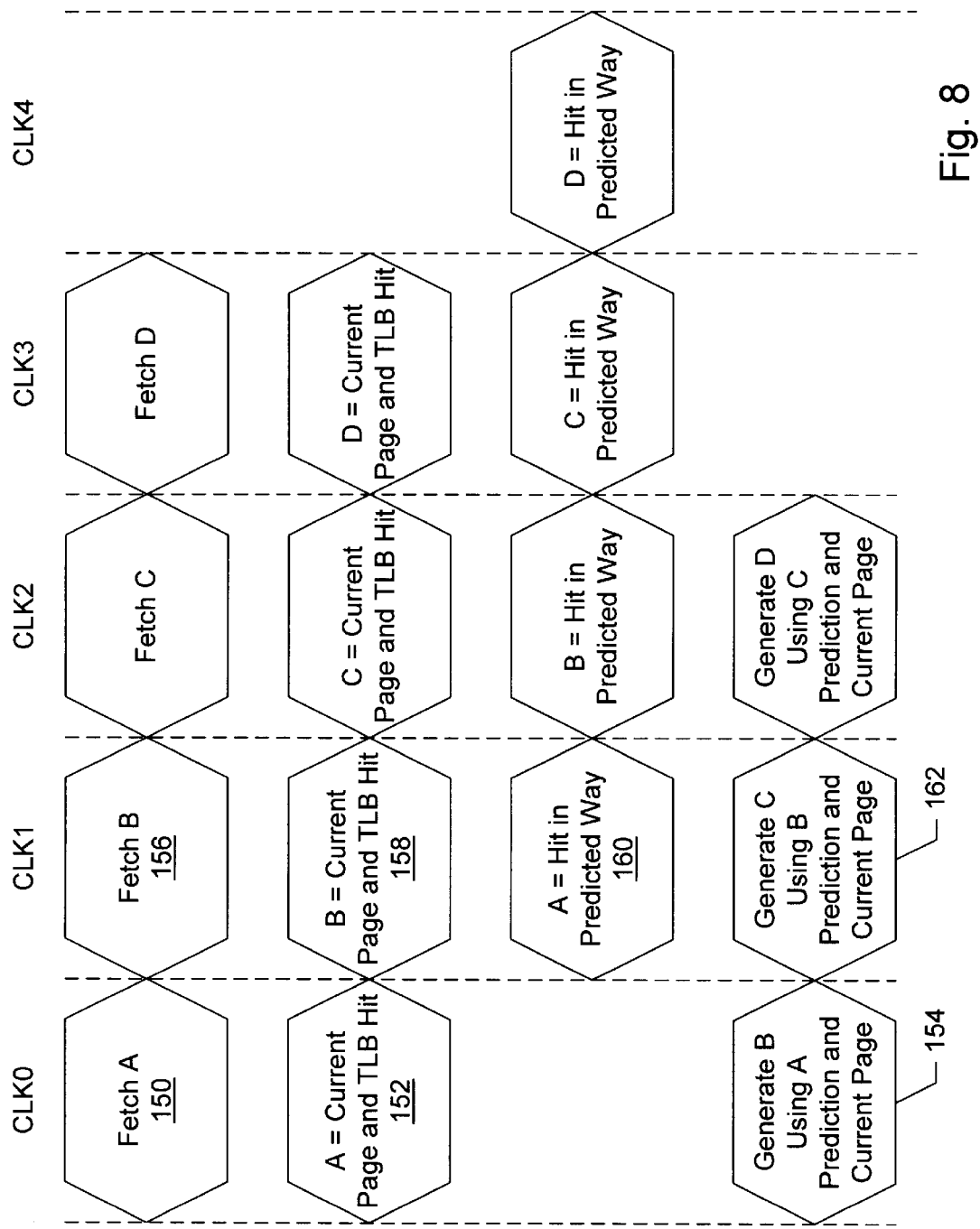
FIG. 8 is a timing diagram illustrating instruction fetching using an embodiment of the instruction cache and the branch prediction unit shown in FIGS. 1 and 3, in which fetch address are within a particular page and hit in a TLB.

Turning now to FIG. 8, a timing diagram is shown illustrating successful prediction of fetch addresses for several clock cycles. Clock cycles are delimited in FIG. 8 with vertical dotted lines, and the clock cycles are labeled at the top of FIG. 8 (e.g. CLK0, CLK1, etc.). During clock cycle CLK0, a fetch address A is presented to instruction cache 16 (reference numeral 150). Branch prediction unit 14 determines that fetch address A is a current page hit (e.g. the physical tag provided by instruction cache 16 matches the real page number stored in current page register 76) and a TLB hit (reference numeral 152). Additionally, a fetch address B is formed using the branch prediction information corresponding to fetch address A and the linear page number stored in current page register 76 (reference number 154).

During clock cycle CLK1, fetch address B is conveyed to instruction cache 16 (reference numeral 156). Fetch address B is found to be a current page hit and a TLB hit (reference numeral 158). Additionally, instruction cache 16 indicates that fetch address A hits in the predicted way (reference numeral 160). Since fetch address A hits in the predicted way and was a current page hit, the fetch pipeline may continue with fetch address B. A fetch address C is formed using the branch prediction information corresponding to fetch address B (reference numeral 162). Clock cycles CLK2 through CLK4 illustrate additional clock cycles of successful fetch address generation.

FIG. 8 illustrates that fetch addresses (which are also branch target addresses, if a taken branch is predicted) may successfully be generated each clock cycle using current page register 76. Advantageously, instruction fetching may be performed each clock cycle even though generating the branch target address may require more than a clock cycle.

Figure 9:
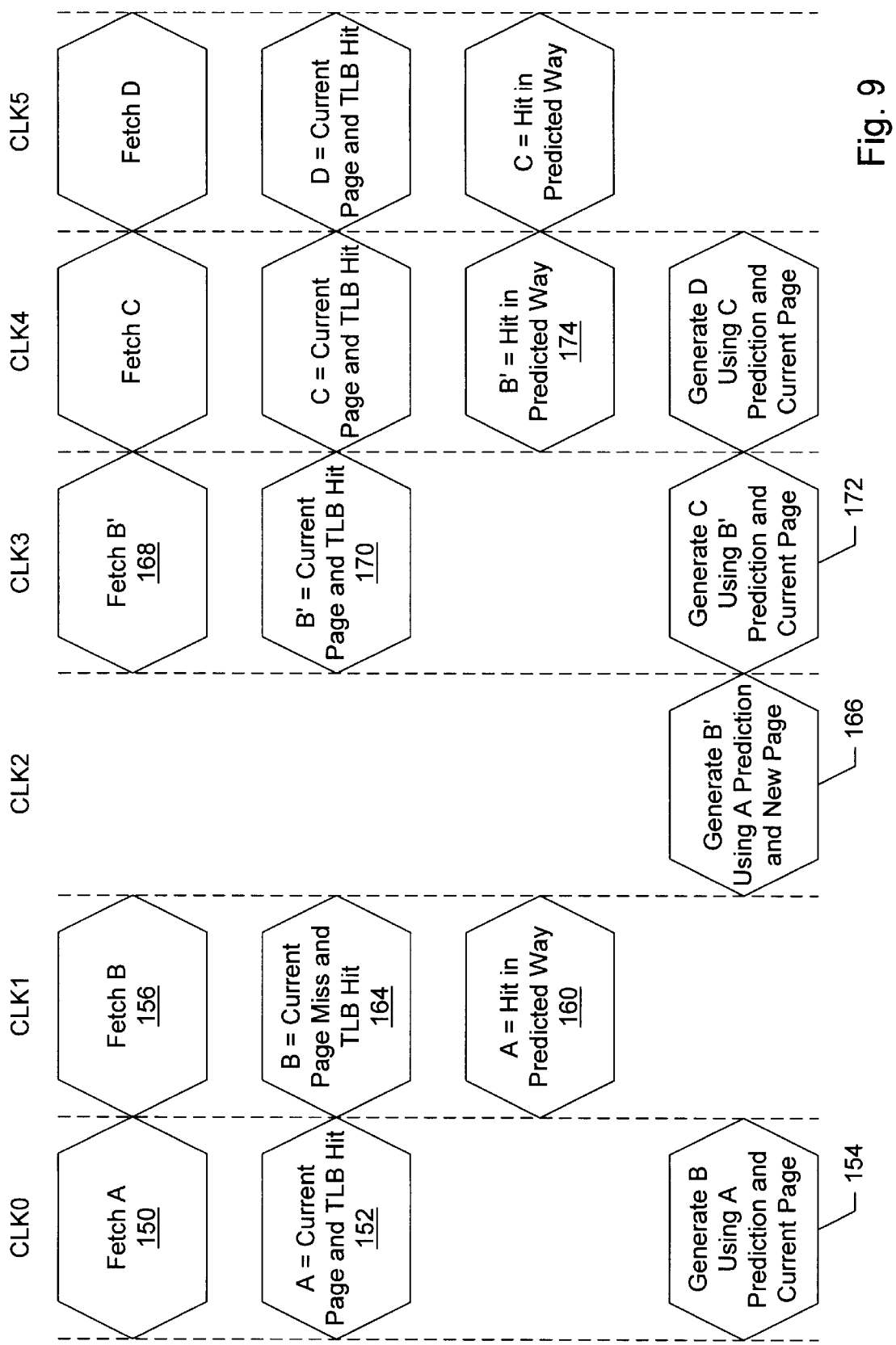
FIG. 9 is a timing diagram illustrating instruction fetching using an embodiment of the instruction cache and the branch prediction unit shown in FIGS. 1 and 3, in which a fetch address is outside a page including other fetch addresses.

FIG. 9 illustrates a case in which a fetch address is found to be a current page miss (i.e. the fetch address is in a different linear page). As illustrated at reference numerals 150, 152, 154, and 160, fetch address A is correctly predicted similar to FIG. 8. Additionally, fetch address B is conveyed to instruction cache 16 during clock cycle CLK1 (reference numeral 156). However, fetch address B is found to be a current page miss (reference numeral 164). Therefore, branch target address B (to be provided to the instruction processing pipeline of microprocessor 10) is incorrectly predicted. During clock cycle CLK2, branch prediction unit 14 generates a corrected branch target (and fetch) address B' using the branch prediction information corresponding to address A and the linear page corresponding to the physical tag from the predicted way provided by reverse TLB 72 (reference numeral 166). Current page register 76 is loaded from the output of TLB 70.

During clock cycle CLK3, fetch address B' is provided to instruction cache 16 (reference numeral 168) and is found to be a current page and TLB hit (reference numeral 170). Additionally, fetch address C is generated using the B' prediction information and the current linear page number (reference numeral 172). During clock cycle CLK4, fetch address B' is found to be a hit in the predicted way (reference numeral 174). Starting with fetch address C during clock cycle CLK4, fetch addresses are once again generated at a one clock cycle/address rate.

Figure 10:
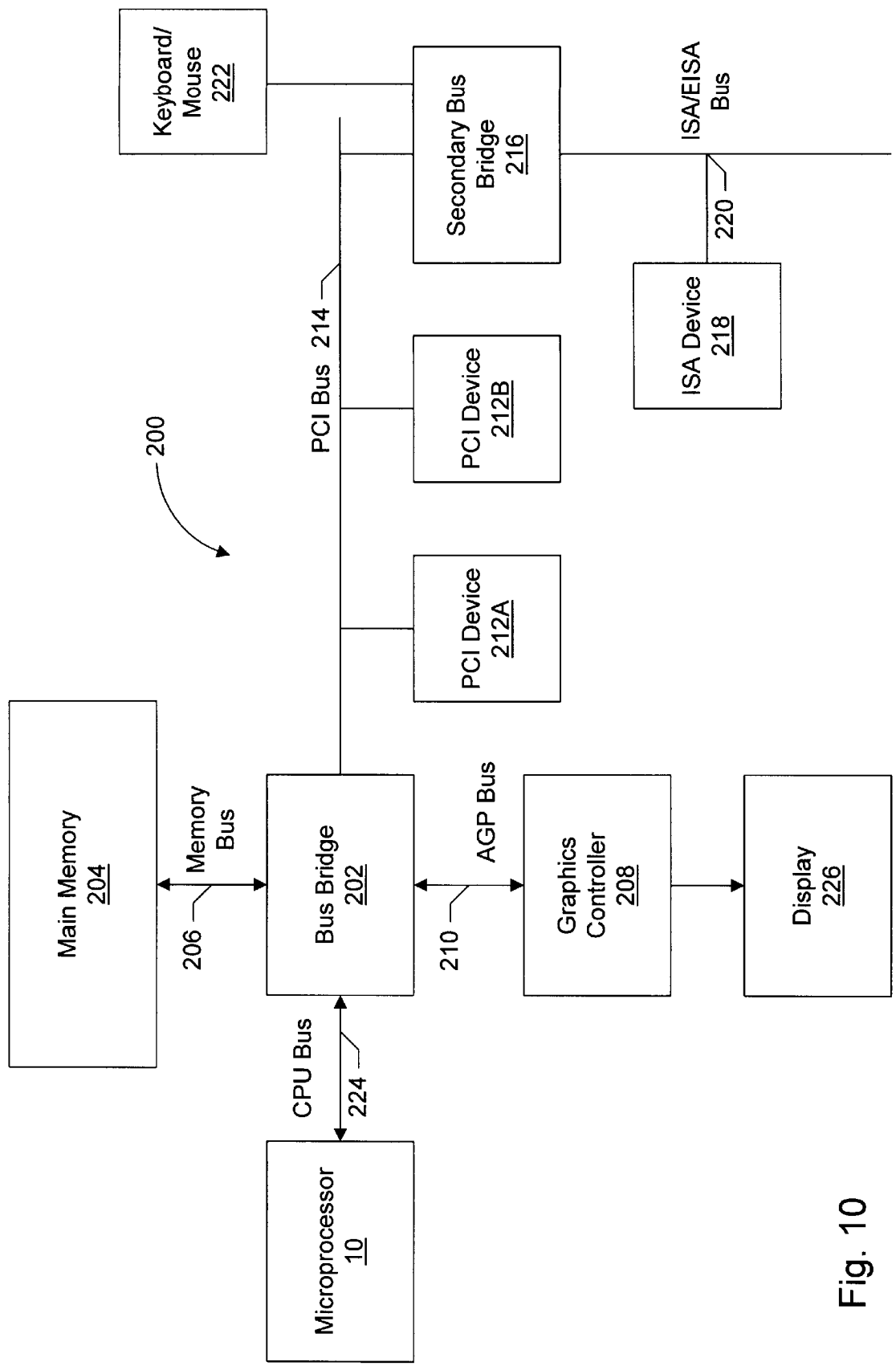
FIG. 10 is a block diagram of one embodiment of a computer system including the microprocessor shown in FIG. 1.

Turning now to FIG. 10, a block diagram of one embodiment of a computer system 200 including microprocessor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
| --- | --- |
| AAA | MROM |
| AAD | MROM |

TABLE 1-continued x86 Fast Path, Double Dispatch, and MROM Instructions

| X86 Instruction | Instruction Category |
|---|---|
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fastpath/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |

TABLE 1-continued x86 Fast Path, Double Dispatch, and MROM Instructions

| X86 Instruction | Instruction Category |
|---|---|
| XADD | MROM |
| XCHG | MROM |
| XLAT | fast path |
| XLATB | fast path |
| XOR | fast path |

Note: Instructions including an SIB byte are also considered double dispatch instructions.

In accordance with the above disclosure, a microprocessor has been shown which employs a linearly addressed, physically tagged instruction cache and a branch prediction unit which stores branch target indexes instead of complete branch target addresses. Using a reverse TLB, branch target addresses can be generated from the physical tags. To allow for single clock cycle access, a current linear page number from a current page register (which stores the page of the most recent translation) is assumed to be the page for the branch target address. If the assumption is incorrect, the correct branch target address is generated using the output of the reverse TLB.

Numerous variations and modifications will become apparent to those skilled in the art once the above disclosure is fully appreciated. It is intended that the following claims be interpreted to embrace all such variations and modifications.

What is claimed is:

1. A microprocessor comprising:

an instruction cache configured to receive a first virtual index, wherein said instruction cache is configured to store a plurality of physical tags and is further configured to select at least one of said plurality of physical tags in response to said first virtual index; and a branch prediction unit coupled to said instruction cache, wherein said branch prediction unit includes a current page register coupled to receive a virtual page number and a corresponding physical page number from a translation lookaside buffer (TLB) included in said branch prediction unit, and wherein said branch prediction unit is configured to form a branch target address for a branch instruction from said first virtual index and said virtual page number from said current page register, and wherein said branch prediction unit further includes a comparator coupled to said current page register and to receive said one of said plurality of physical tags, and wherein said comparator is configured to compare said one of said plurality of physical tags to said corresponding physical page number stored in said current page register, and wherein said branch prediction unit is configured to verify said branch target address responsive to a signal from said comparator.

2. The microprocessor as recited in claim 1 wherein said branch prediction unit is configured to store a plurality of branch predictions, each of said plurality of branch predictions comprising a different virtual index, and wherein one of said plurality of branch predictions comprises said first virtual index.

3. The microprocessor as recited in claim 1 wherein said branch prediction unit is configured to cancel said branch target address formed using said virtual page number if said signal from said comparator indicates a mismatch.

4. The microprocessor as recited in claim 3 wherein said branch prediction unit is further configured to update said current page register with a second virtual page number and a corresponding second physical page number from said TLB.

5. The microprocessor as recited in claim 1 wherein said virtual page number comprises a linear page number.

6. A branch prediction unit comprising:

a branch prediction control unit configured to generate a first branch target address corresponding to a branch instruction, wherein said first branch target address comprises a virtual address;

a current page register configured to store a current virtual page number and a corresponding current physical page number corresponding to a second branch target address generated by said branch control unit prior to generating said first branch target address, wherein said branch prediction control unit is configured to use said current virtual page number to generate said first branch target address; and a comparator coupled to said current page register and said branch prediction control unit, wherein said comparator is configured to compare said corresponding current physical page number to a physical tag received from an instruction cache in response to said first branch target address, and wherein said branch prediction control unit is configured to verify said first branch target address responsive to a signal from said comparator.

7. The branch prediction unit as recited in claim 6 further comprising a branch prediction storage, wherein said branch prediction storage is configured to store a plurality of branch prediction indexes corresponding to a plurality of cache lines stored in said instruction cache.

8. The branch prediction unit as recited in claim 7 wherein said branch prediction control unit is configured to read a particular one of said plurality of branch prediction indexes when a corresponding particular one of said plurality of cache lines; is fetched from said instruction cache.

9. The branch prediction unit as recited in claim 8 wherein said branch prediction control unit is configured to concatenate said particular one of said plurality of branch prediction indexes to said current virtual page number to form said first branch target address.

10. The branch prediction unit as recited in claim 6 wherein said branch prediction control unit is further configured to cancel said first branch target address if said current physical page number and said physical tag mismatch.

11. The branch prediction unit as recited in claim 10 further comprising a translation lookaside buffer (TLB) coupled to receive said first branch target address and to provide a corresponding first physical page number, and wherein said first physical page number is compared to said physical tag to determine a hit/miss condition for said instruction cache.

12. The branch prediction unit as recited in claim 11 wherein said branch prediction control unit is configured to update said current page register with said first physical page number and a corresponding first virtual page number if said current physical page number and said physical tag mismatch.

13. A method for predicting a branch target address comprising:

storing a current virtual page number and a corresponding current physical page number responsive to a first fetch address within a page corresponding to said current virtual page number and said current physical page number;

selecting a branch prediction index from a branch prediction storage in response to a second fetch address;

forming said branch target address from said current virtual page number and said branch prediction index; and comparing said current physical page number to a physical tag selected from an instruction cache in response to said branch target address being presented to said instruction cache as a third fetch address to verify said branch target address.

14. The method as recited in claim 13 wherein said forming comprises concatenating said current virtual page number and said branch prediction index.

15. The method as recited in claim 13 wherein said forming further comprises cancelling said branch target address if said current physical page number and said physical tag mismatch.

16. The method as recited in claim 15 further comprising updating said current virtual page number and said corresponding current physical page number upon detecting a mismatch between said current physical page number and said physical tag.

* * * * *

UNITED STATES PATENT AND TRADEMARK OFFICE
CERTIFICATE OF CORRECTION

PATENT NO. : 6,079,005
DATED : June 20, 2000
INVENTOR(S) : David B. Witt and Thang M. Tran It is certified that error appears in the above-indentified patent and that said Letters Patent is hereby corrected as shown below:

In the Claims:

Claim 6, col. 26, line 28, please align "first branch target..." with the line above it.

Claim 8, col. 26, line 40, after "cache lines" please delete ";".

Signed and Sealed this

Third Day of April, 2001

*Attest:*

NICHOLAS P. GODICI

*Attesting Officer*     *Acting Director of the United States Patent and Trademark Office*